United States Patent Office 3,141,831
Patented July 21, 1964

3,141,831
PROCESS FOR PRODUCING L-GLUTAMIC ACID
Masami O'hara, Setagaya-ku, Tokyo, Takuji Tsuchiya, Suginami-ku, Tokyo, Akio Kawamoto and Tsuyoshi Shiio, Kawasaki-shi, Kanagawa-ken, Shinichi Motozaki, Setagaya-ku, Tokyo, Toshinao Tsunoda, Zushi-shi, Kanagawa-ken, and Kazumoto Kinoshita, Meguro-ku, Tokyo, Japan, assignors to Ajinomoto Kabushiki Kaisha and Sanraku Shuzo Kabushiki Kaisha, Takara-cho, Chuo-ku, Tokyo, Japan, a corporation of Japan
No Drawing. Filed Jan. 4, 1962, Ser. No. 164,388
Claims priority, application Japan Jan. 24, 1961
16 Claims. (Cl. 195—47)

This invention relates to fermentative processes for producing L-glutamic acid, and more particularly to processes for producing L-glutamic acid which include the step of carrying out the fermentation for producing L-glutamic acid in a medium containing plant growth hormone.

It is an object of this invention to produce and accumulate markedly great amounts of L-glutamic acid in the mediums of the aforesaid type.

In fermentative processes for producing L-glutamic acid, it is a problem to accelerate the rate of growth of the fermenting microorganism. It is still another problem of a great importance, however, to control the conditions of the fermentation, because there is quite a subtle relation between the growth of the employed microorganism and the fermentation. Therefore the conditions of the fermentation in question must be properly set up by applying a plant growth hormone to the medium to obtain as high a yield as possible.

Heretofore, biotin or vitamins have been used for this purpose in fermentative processes for producing L-glutamic acid. By adding a suitable quantity of biotin to the fermentation medium, the relation between the growth of the fermenting microorganism and the fermentation can be controlled.

We have discovered through research in the production of L-glutamic acid by fermentation that the addition of plant growth hormones successfully controls both the fermentation rate and the growth of the fermenting microorganism and, as a result, a great amount of L-glutamic acid can be produced and accumulated in a fermentation medium.

The hormones that we have applied are completely different in their chemical structures from both biotin and vitamins that have heretofore been used in conventional fermentative processes. They probably also have considerably different influences both upon the metabolism of the microorganism and upon the working mechanism of fermentation processes; i.e., they not only accelerate and maintain a suitable rate of growth of the microorganism but also furnish it with a capability for producing and accumulating L-glutamic acid.

For carrying out processes with the aid of these substances, a proper consideration of the aforesaid hormones is necessarily used, depending upon the applied microorganism.

In fermentative processes for producing L-glutamic acid, the application of the plant growth hormones instead of biotin, vitamins or other nutrients proves to be remarkably effective as to the following points: first, the production cost of L-glutamic acid is reduced because of the ease in obtaining an abundant quantity of plant growth hormones at low prices and, secondly, when these hormones of a constant purity and potency are used, both the growth rate of the microonganism and the fermentation are easily controlled.

The substances listed hereinbelow are plant growth hormones which show positive hormone effects in the tomato test, avena test, pea test and radish test.

β-Indoleacetic acid
β-Indoleacetaldehyde
β-Indolepropionic acid
β-Indolebutyric acid
β-Indolevaleric acid
Indene-3-acetic acid
Phenylacetic acid
Phenoxyacetic acid
p-Chlorophenoxyacetic acid
p-Bromophenoxyacetic acid
2,4-dichlorophenoxyacetic acid
2,4-dichlorophenoxyacetamide
2,4,5-trichlorophenoxyacetic acid
2,4,5-trichlorophenoxyacetaldehyde
3,4-dimethylphenoxyacetic acid
α-(2,4-dichlorophenoxy)-propionic acid
2,4,5-trichlorophenoxypropionic acid
2,4-dichlorophenoxycaproic acid
α-Naphthylacetic acid
β-Naphthylacetic acid
β-Naphthoxyacetic acid
β-Naphthoxypropionic acid
Anthracene-acetic acid
2,3,6-trichlorobenzoic acid
2,3,5-triiodobenzoic acid
Phenacetyl-leucine
Maleic hydrazide In the aforementioned tests which show positive hormone effects, the tomato test is described by T. Mitsui on pages 465–471, 1950, volume 24, of the Journal of Agricultural Chemistry Society of Japan. Briefly stated, this test includes the selection of the uppermost non-germ bearing petiole of a young tomato plant, coating the petiole on one side with lanolin containing plant growth hormone and then measuring the epinasty (the amount of bending angle) produced after several hours.

The radish test is described by Y. Sumiki in the article entitled "Plant Growth Hormone," Y. Sumiki, on pages 326–327, published by Kawada Shobo, and comprises coating one side of the cotyledon of a young seasonless radish plant with plant growth hormone and then measuring the amount of bending angle produced after 12 hours.

The avena test comprises placing a gelatine mass containing plant growth hormone on the upper side of a young coleoptile (the first leaf of a monocotyledon which forms a protective sheath) of avena and then measuring the bending degree produced after 90 minutes.

The pea test comprises cutting deeply into a part of the stem of a young pea plant. When such cut stem is inserted into water, its cut sides open outwardly. However, when the cut stem is inserted into a solution of plant growth hormone, after a period of 4 to 24 hours, the ends of both of the sides of the stem bend inwardly.

Generally, these plant growth hormone test can be summarized as showing a positive hormone effect when the side of a stem of a plant under test (including the petiole and cotyledon) which has absorbed plant growth hormone extends substantially more than the side not subjected to the plant growth hormone. Such greater extending is objectively measurable by the degree of bending (epinasty) exhibited.

When the plant growth hormones which are in the form of acids are applied in this process, this may be used in free acid form or they may be used after they have been converted to esters, amides, inorganic salts, or amine salts.

This invention, when put into practice, may be applied in both general types of fermentation media. One of the two types of media consists only of synthetic compounds; i.e., it is a completely synthetic medium in which fermentation is to take place. If a completely synthetic medium is capable of the desired fermentation with success, its use provides great advantages in controlling the fermentation and in other particulars as shown hereinbelow in Examples 2, 3 and 4. The other type of medium is one which contains substances obtained from nature as well as synthetic ones, together with the plant growth hormone or hormones. When a natural substance such as soy bean protein hydrolyzate is added to a medium, the results are also satisfactory as shown hereinbelow in Examples 6 and 7. Fermentation does not proceed to the extent produced in Examples 6 and 7 in the medium from which the hormone is absent. As a result, it may be concluded that the addition of a natural substance to the medium creates a nutritive environment advantageous for the production and accumulation of glutamic acid, while the plant growth hormones are believed to provide the employed microorganism with the ability to produce and accumulate glutamic acid. The microorganisms which have a strong ability to produce L-glutamic acid from saccharide materials and nitrogenous compounds are suitably employable in the process of this invention. They are, for example, such microorganisms as belong to the genus Brevibacterium (for instance, *Brev. kawasakii, Brev. lactofermentum, Brev. flavum., Brev. roseum, Brev. immariophilium, Brev. saccharolyticum, Brev. aquapile* and *Brev. divaricatum*), Escherichia, Bacillus, Corynebacterium, Microbacterium, Micrococcus, Pseudomonas.

As examples of saccharide materials, these may be glucose, sucrose, fructose, maltose, and starch hydrolyzate. As for the nitrogen source, there may be utilized such nitrogenous substances as ammonium salts, nitrates, urea, aqueous ammonia and gaseous ammonia. When ammonium salts are used, it is desirable to add to the medium such neutralizing agents as calcium carbonate, potassium hydroxide and sodium hydroxide before or during fermentation, since the pH value of the medium goes down as their assimilation proceeds. The fermentation medium also contains supplementarily the inorganic salts and ions of which the microorganism is in need. Those are, for instance, $KH_2PO_4$, $K_2HPO_4$, $MgSO_4$, Fe ions, Mn ions or the like.

In accordance with this invention, the fermentation is preferably to proceed aerobically at a pH value of approximately between 5.0 and 8.5, and at a temperature of approximately between 27° C. and 37° C.

EXAMPLE 1

Various kinds of bacteria described in Table I were inoculated and cultured in a medium containing 10 g./dl. of glucose, 1 g./dl. of $(NH_4)_2SO_4$, 0.1 g./dl. of $KH_2PO_4$, 20 mg./dl. of $MgSO_4.7H_2O$, 1 mg./dl. of $FeSO_4.7H_2O$ and 20 γ/dl. of vitamin $B_1$ with and without a plant growth hormone as described in Table I.

The results obtained in this example are shown in Table I. The designation, "+" signifies that the rate of growth of the used bacteria is very high, while the designation "−" signifies that it is very low.

*Table I*

EFFECT OF THE ADDITION OF THE PLANT GROWTH HORMONE ON THE RATE OF THE GROWTH OF BACTERIA

| Plant Growth Hormone Added | β-Indoleacetic Acid, γ/dl. | | 2,4-Dichlorophenoxyacetic Acid, γ/dl. | | 2,4,5-Trichlorophenoxyacetic Acid, γ/dl. | | p-Chlorophenoxyacetic Acid, γ/dl. | | β-Naphthoxyacetic Acid, γ/dl. | |
|---|---|---|---|---|---|---|---|---|---|---|
| Amount of Plant Growth Hormone | 20 | 0 | 50 | 0 | 50 | 0 | 10 | 0 | 50 | 0 |
| Bacteria: | | | | | | | | | | |
| *Escherichia coli* | + | − | + | − | + | − | + | − | + | − |
| *Pseudomonas sp.* | + | − | + | − | + | − | + | − | + | − |
| *Bacillus subtilis* | + | − | + | − | + | − | + | − | + | − |
| *Brevibacterium lactofermentum* ATCC No. 13869 | + | − | + | − | + | − | + | − | + | − |
| *Brevibacterium flavum* ATCC No. 14067 | + | − | + | − | + | − | + | − | + | − |

It will be evident from Table I that the rate of growth of bacteria is very high in the case of culturing them in media containing a plant growth hormone in accordance with this invention, whereas it is very low in media not containing such hormones.

EXAMPLE 2

Media containing the following ingredients were prepared, adjusted to a pH of 7.0 and sterilized:

Glucose _____ 10 g./dl.
Urea _____ 0.3 g./dl.
$KH_2PO_4$ _____ 0.1 g./dl.
$MgSO_4.7H_2O$ _____ 40 mg./dl.
$FeSO_4.7H_2O$ _____ 1 mg./dl.
Plant growth hormone__ Amounts described in Table II.

*Brevibacterium lactofermentum* ATCC No. 13869 was inoculated into the medium, followed by culturing the same at 30° C. with shaking for 40 hours. There was added a 45% aqueous urea solution to the medium when the value of pH in the medium dropped during the fermentation.

The growth of the bacteria and the accumulated amounts of L-glutamic acid are shown in Table II.

*Table II*

| Plant Growth Hormone | | Growth | Yield of L-Glutamic Acid (percent) |
|---|---|---|---|
| Name | Added Amount (γ/dl.) | | |
| β-Indoleacetic Acid | 5 | 0.49 | 26.0 |
| Do | 10 | 0.52 | 26.0 |
| Do | 20 | 0.56 | 37.8 |
| Do | 50 | 0.80 | 25.6 |
| Do | 200 | 0.80 | 24.0 |
| Do | 500 | 0.81 | 22.0 |
| 2,4-Dichlorophenoxy-acetic Acid | 10 | 0.64 | 28.0 |
| Do | 50 | 0.67 | 38.0 |
| Do | 200 | 0.70 | 32.4 |
| 2,4,5-Trichlorophenoxyacetic Acid | 10 | 0.54 | 28.2 |
| Do | 50 | 0.62 | 37.4 |
| Do | 200 | 0.68 | 32.8 |
| p-Chlorophenoxyacetic Acid | 5 | 0.46 | 29.5 |
| Do | 10 | 0.52 | 32.4 |
| Do | 50 | 0.68 | 24.7 |
| β-Naphthoxyacetic Acid | 10 | 0.56 | 30.6 |
| Do | 50 | 0.65 | 36.8 |
| Do | 200 | 0.70 | 28.4 |

In the above table, "Growth" represents degree of turbidity in the fermentation broth diluted to 26 times at 562 Mμ, and the yield of L-glutamic acid is based on the weight of initial sugar.

It is obvious from the above examples that it is important in the fermentation control to adjust the subtle relation between the growth of bacteria and the fermentation, and for this purpose, it has been found to be very effective to add a suitable amount of the plant growth hormone to the medium in accordance with this invention.

EXAMPLE 3

A medium containing the following ingredients was prepared, adjusted to a pH of 7.0 and sterilized.

| | |
|---|---|
| Glucose | g./dl.__ 10 |
| Urea | g./dl.__ 0.3 |
| KH$_2$PO$_4$ | g./dl.__ 0.1 |
| MgSO$_4$.7H$_2$O | mg./dl.__ 40 |
| FeSO$_4$.7H$_2$O | mg./dl.__ 1 |
| β-Indoleacetic acid | γ/dl.__ 30 |

*Brevibacterium lactofermentum* ATCC No. 13869 was inoculated, followed by culturing with shaking at 30° C. for 40 hours. There was added a 45% aqueous urea solution to the medium when the pH of the medium dropped. The yield of L-glutamic acid accumulated was 39.4% based on the weight of initial glucose.

EXAMPLE 4

Example 3 was repeated except that 50 γ/dl. of 2,4-dichlorophenoxyacetic acid was used instead of 30 γ/dl. of β-indoleacetic acid.

The yield of L-glutamic acid accumulated was 38.4% based on the weight of initial glucose.

EXAMPLE 5

A medium containing the following ingredients was prepared, adjusted to a pH 7.0 and sterilized:

| | |
|---|---|
| Glucose | g./dl.__ 10 |
| Urea | g./dl.__ 1 |
| KH$_2$PO$_4$ | g./dl.__ 0.1 |
| MgSO$_4$.7H$_2$O | mg./dl.__ 20 |
| FeSO$_4$.7H$_2$O | mg./dl.__ 1 |
| Vitamin B$_1$ | γ/dl.__ 20 |
| β-Indoleacetic acid | γ/dl.__ 30 |

*Brevibaceterium flavum* ATCC No. 14067 was inoculated and the fermentation was carried out in the same manner as in Example 3.

The yield of L-glutamic acid accumulated was 32.0% based on the weight of initial glucose.

EXAMPLE 6

A medium containing the following ingredients was prepared, adjusted at pH 7.0 and sterilized:

| | |
|---|---|
| Glucose | g./dl.__ 10 |
| Urea | g./dl.__ 0.8 |
| KH$_2$PO$_4$ | g./dl.__ 0.1 |
| MgSO$_4$.7H$_2$O | mg./dl.__ 40 |
| Fe$^{++}$ | p.p.m.__ 2 |
| Soy bean protein hydrolyzate (total nitrogen 2.44 g./dl.) | ml./dl.__ 0.5 |
| β-Indoleacetic acid | γ/dl.__ 10 |

*Brevibacterium lactofermentum* ATCC No. 13869 was inoculated, followed by culturing with shaking at 30° C. for 40 hours. A 45% aqueous urea solution was added to the medium to maintain the pH at 7.0 when the pH of the medium dropped during the fermentation.

The yield of L-glutamic acid accumulated in the medium was 46.2% based on the weight of initial sugar.

28.6 g. of crystalline L-glutamic acid was obtained by neutralizing 1 liter of the fermentation broth with hydrochloric acid to a pH of 3.2.

EXAMPLE 7

Example 6 was repeated except that 2,4-dichlorophenoxyacetic acid was used instead of β-indoleacetic acid.

The yield of L-glutamic acid accumulated in the medium was 46.3% based on the weight of initial sugar.

EXAMPLE 8

A medium containing the following ingredients was prepared and sterilized:

Starch hydrolyzate (containing 5 g./dl. of reducing sugar glucose):

| | |
|---|---|
| (NH$_4$)$_2$SO$_4$ | g./dl.__ 1.5 |
| CaCO$_3$ | g./dl.__ 2.0 |
| KH$_2$PO$_4$ | g./dl.__ 0.1 |
| MgSO$_4$.7H$_2$O | mg./dl.__ 40 |
| Fe$^{++}$ | p.p.m.__ 2 |
| Mn$^{++}$ | p.p.m.__ 2 |
| Soy bean hydrolyzate | ml./dl.__ 0.5 |
| 2,4-dichlorophenoxyacetic acid | γ/dl.__ 50 |

*Bacillus megatherium* ATCC No. 13420 was inoculated and the fermentation was carried out at about 5.0–8.5 of pH and at about 27–37° C.

The yield of L-glutamic acid accumulated in the medium was 18% based on the weight of initial sugar at the 50th hour from the beginning of the fermentation.

EXAMPLE 9

The medium containing the following ingredients was prepared, sterilized and then adjusted to a pH of 7.5–8.0 by the addition of gaseous ammonia:

Starch hydrolyzate (conversion coefficient of saccharification 95%), 5 g./dl. or 10 g./dl. (calculated as reducing sugar):

| | |
|---|---|
| KH$_2$PO$_4$ | g./dl.__ 0.1 |
| MgSO$_4$.7H$_2$O | mg./dl.__ 40 |
| Fe$^{++}$ | p.p.m.__ 2 |
| Mn$^{++}$ | p.p.m.__ 2 |
| 2,4-dichlorophenoxyacetic acid | γ/dl.__ 50 |
| Vitamin B$_1$ hydrochloride | γ/dl.__ 10 |
| Soy bean hydrolyzate | ml./dl.__ 1 |

The microorganisms described in Table III were inoculated into the medium and cultured at 30–35° C. for 48 hours under aerobic conditions. There was added gaseous ammonia to the medium to maintain the pH at 7.4–8.4 when the pH of the medium dropped during the fermentation.

The obtained results are shown in Table III. In the table, the yield of L-glutamic acid accumulated in the medium is based on the weight of initial sugar.

*Table III*

| Name of the Microorganism used | Concentration of Starch Hydrolyzate (g./dl.) | Yield of L-glutamic Acid (percent) |
|---|---|---|
| *Brevibacterium roseum* Strain No. 7 (ATCC No. 13825) | 10 | 45 |
| *Brevibacterium flavum* Strain No. 1223 (ATCC No. 13826) | 10 | 44 |
| *Brevibacterium lactofermentum* Strain No. 2256 (ATCC No. 13869) | 10 | 45 |
| *Brevibacterium lactofermentum* Strain No. 2362 (ATCC No. 13655) | 10 | 44 |
| *Brevibacterium saccharolyticum* Strain No. 7637 (ATCC No. 14066) | 10 | 43 |
| *Brevibacterium flavum* Strain No. 2247 (ATCC No. 14067) | 10 | 47 |
| *Brevibacterium immariophilium* Strain No. 2237 (ATCC No. 14068) | 10 | 32 |
| Bacteria analogous to *Bacillus circulans* (ATCC No. 13403) | 5 | 32 |
| *Bacillus megatherium* (ATCC No. 13420) | 5 | 37 |
| *Corynebacterium acetoacidolphilum* Strain No. 410 (ATCC No. 13870) | 5 | 25 |

What we claim is:

1. A process for producing L-glutamic acid which comprises cultivating a microorganism of a genus selected from the group consisting of Brevibacterium, Bacillus, Escherichia, Corynebacterium, Microbacterium, Micrococcus, and Pseudomonas and strongly capable of producing L-glutamic acid from saccharide materials, nitrogenous substances, inorganic salts essential to the nutrition of said microorganisms and plant growth hormones in an amount effective to promote microorganism growth and control fermentation rate, said hormones being selected from the group consisting of β-indoleacetic acid, β-indoleacetaldehyde, β-indolepropionic acid, β-indolebutyric acid, β-indolevaleric acid, indene-3-acetic acid, phenylacetic acid, phenoxyacetic acid, p-chlorophenoxyacetic acid, p-bromophenoxyacetic acid, 2,4-dichlorophenoxyacetic acid, 2,4-dichlorophenoxyacetamide, 2,4,5-trichlorophenoxyacetic acid, 2,4,5-trichlorophenoxyacetaldehyde, 3,4-di-methylphenoxyacetic acid, α-(2,4-dichlorophenoxy)-propionic acid, 2,4,5-trichlorophenoxypropionic acid, 2,4-dichlorophenoxycaproic acid, α-naphthylaceticacid, β-naphthylacetic acid, β-naphthoxyacetic acid, β-naphthoxypropionic acid, anthracene-acetic acid, 2,3,6-trichlorobenzoic acid, 2,3,5-triiodobenzoic acid, phenacetylleucine, and maleic hydrazide.

2. A process for producing L-glutamic acid which comprises cultivating a microorganism of a genus selected from the group consisting of Brevibacterium, Bacillus, Escherichia, Corynebacterium, Microbacterium, Micrococcus, and Pseudomonas and strongly capable of producing L-glutamic acid from saccharide materials in a medium containing said saccharide materials, nitrogenous substances, inorganic salts essential to the nutrition of said microorganism and in an amount effective to promote microorganism growth and control fermentation rate β-indoleacetic acid and recovering the accumulated L-glutamic acid from said medium.

3. A process as defined in claim 2 wherein said β-indoleacetic acid is present in a concentration of from 5 to 500 γ/dl.

4. A process for producing L-glutamic acid which comprises cultivating a microorganism of a genus selected from the group consisting of Brevibacterium, Bacillus, Escherichia, Corynebacterium, Microbacterium, Micrococcus, and Pseudomonas and strongly capable of producing L-glutamic from saccharide materials in a medium containing said saccharide materials, nitrogenous substances, inorganic salts essential to the nutrition of said microorganism, and 2,4-dichlorophenoxyacetic acid in an amount effective to promote microorganism growth and control fermentation rate, and recovering accumulated L-glutamic acid from said medium.

5. A process as defined in claim 4 wherein said 2,4-dichlorophenoxyacetic acid is present in a concentration 10 to 200 γ/dl.

6. A process for producing L-glutamic acid which comprises cultivating a microorganism of a genus selected from the group consisting of Brevibacterium, Bacillus, Escherichia, Corynebacterium, Microbacterium, Micrococcus, and Pseudomonas and strongly capable of producing L-glutamic acid from saccharide materials in a medium containing said saccharide materials, nitrogenous substance, inorganic salts essential to the nutrition of said microorganism and 2,4,5-trichlorophenoxyacetic acid in an amount effective to promote microorganism growth and control fermentation rate and recovering the accumulated L-glutamic acid from said medium.

7. A process as defined in claim 6 wherein said 2 4,5-trichlorophenoxyacetic acid is present in a concentration of 10 to 200 γ/dl.

8. A process for producing L-glutamic acid which comprises cultivating a microoragnism of a genus selected from the group consisting of Brevibacterium, Bacillus, Escherichia, Corynebacterium, Microbacterium, Micrococcus, and Pseudomonas and strongly cable of producing L-glutamic acid from saccharide materials in a medium containing said saccharide materials, nitrogenous substances, inorganic salts essential to the nutrition of said microorganism and p-chlorophenoxyacetic acid in an amount effective to promote microorganism growth and control fermentation rate, and recovering the accumulated L-glutamic acid from said medium.

9. A process as defined in claim 8 wherein said p-chlorophenoxyacetic acid is present in a concentration of 5 to 50 γ/dl.

10. A process for producing L-glutamic acid which comprises cultivating a microorganism of a genus selected from the group consisting of Brevibacterium, Bacillus, Escherichia, Corynebacterium, Microbacterium, Micrococcus, and Pseudomonas and strongly capable of producing L-glutamic acid from saccharide materials in a medium containing said saccharide materials, nitrogenous substances, inorganic salts essential to the nutrition of said microorganism and β-naphthoxyacetic in an amount effective to promote microorganism growth and control fermentation rate, and recovering the accumulated L-glutamic acid from said medium.

11. A process as defined in claim 10 wherein said β-naphthoxyacetic acid is present in a concentration of 10 to 200 γ/dl.

12. A process as defined in claim 2 wherein said medium further contains vitamin $B_1$ hydrochloride.

13. A process as defined in claim 2 wherein said saccharide material is glucose and said nitrogenous substance is urea.

14. A process as defined in claim 2 wherein said nitrogenous substances comprise urea and soy bean protein hydrolyzate.

15. A process as defined in claim 4 wherein said saccharide material is starch hydrolysate and said nitrogenous substances comprise ammonium sulfate and soy bean hydrolyzate.

16. A process as defined in claim 4 wherein said saccharide material is starch hydrolyzate, wherein said nitrogenous substance is soy bean hydrolyzate, and wherein said medium further contains vitamin $B_1$ hydrochloride.

References Cited in the file of this patent

UNITED STATES PATENTS 2,440,357     Behrens et al.     Apr. 27, 1949

OTHER REFERENCES

Bonner et al.: Proc. Natl. Acad. Sci. (1939), pages 184–188.

Chao et al.: Journal of Bacteriology 77, 715–726 (1959).